US006677398B2

(12) United States Patent
Egolf et al.

(10) Patent No.: US 6,677,398 B2
(45) Date of Patent: Jan. 13, 2004

(54) AQUEOUS INK BINDER COMPOSITION

(75) Inventors: Scott Lind Egolf, Lansdale, PA (US); William Christopher Finch, Blue Bell, PA (US); Aaron Thomas Mailloux, Lafayette Hill, PA (US); Miao-Hsun Li Sheng, Lower Gwyned, PA (US); Stephen Lee Walker, Marengo, IL (US)

(73) Assignee: Rohm and Haas Company, Philadelphia, PA (US)

( * ) Notice: Subject to any disclaimer, the term of this patent is extended or adjusted under 35 U.S.C. 154(b) by 190 days.

(21) Appl. No.: 10/061,396

(22) Filed: Feb. 1, 2002

(65) Prior Publication Data

US 2003/0171480 A1 Sep. 11, 2003

(51) Int. Cl.$^7$ .................................................. C08J 3/00
(52) U.S. Cl. ...................................... 524/522; 524/521
(58) Field of Search .......................................... 524/522

(56) References Cited

U.S. PATENT DOCUMENTS

| | | | |
|---|---|---|---|
| 4,845,149 A | 7/1989 | Frazee | 524/458 |
| 4,923,919 A | 5/1990 | Frazee | 524/460 |
| 5,284,894 A | 2/1994 | Wasyliw et al. | 524/377 |
| 5,705,554 A | 1/1998 | Chou et al. | 524/460 |
| 5,821,283 A * | 10/1998 | Hesler et al. | 523/161 |
| 6,054,526 A | 4/2000 | Betremieux et al. | 524/802 |
| 6,258,888 B1 | 7/2001 | Peters et al. | 524/522 |
| 6,379,813 B1 | 4/2002 | Anderson et al. | 428/483 |

FOREIGN PATENT DOCUMENTS

| | | |
|---|---|---|
| EP | 0 73 117 A2 | 3/1996 |
| EP | 258 753 B2 | 8/1997 |

* cited by examiner

*Primary Examiner*—Bernard Lipman
(74) *Attorney, Agent, or Firm*—Ronald D. Bakule

(57) ABSTRACT

An aqueous ink binder including 30–60%, by weight based on the dry weight of the binder composition, of a first polymer including, as polymerized units, 15–75%, by weight based on the weight of the first polymer, ethylenically unsaturated carboxylic acid monomer having a pKa from 2.0 to 4.6, the first polymer having a calculated Hansch parameter from 1.3 to 2.1, and 70–40%, by weight based on the dry weight of the binder composition, of a second polymer, the second polymer being an aqueous emulsion polymer is provided. Also provides are a clear or pigmented ink composition and a method for providing an ink which has press resolublility and, as a dry film, water resistance.

8 Claims, No Drawings

AQUEOUS INK BINDER COMPOSITION

This invention relates to an aqueous ink binder composition, particularly to an aqueous ink binder including (a) 30–60%, by weight based on the dry weight of the binder composition, of a first polymer including, as polymerized units, 15–75%, by weight based on the weight of the first polymer, ethylenically unsaturated carboxylic acid monomer having a pKa from 2.0 to 4.6, the first polymer having a calculated Hansch parameter from 1.3 to 2.1, and (b) 70–40%, by weight based on the dry weight of the binder composition, of a second polymer, the second polymer being an aqueous emulsion polymer. Also the invention relates to an aqueous ink composition including the ink binder and a method for providing an aqueous ink having press resolubility and, as a dry ink film, water resistance.

"Aqueous ink compositions" herein include both pigmented inks and unpigmented inks, such as are known in the art as overprint varnishes. Aqueous ink compositions including a soluble resin and an emulsion polymer and the formation of such compositions by blending and by various two-stage polymerization strategies have been disclosed. Such compositions have been posited to offer beneficial ink properties such as rheology. However, the inks formed therefrom have either exhibited unacceptable resolubility on the press or poor water resistance as the dried ink film. When the resolubility of the ink on the press is unacceptable a brief press stoppage permits the ink to dry to an extent that the ink does not redissolve in fresh ink on restarting the press, thereby causing the transfer of dry ink particles to press surfaces and ultimately to the finished printed substrate surface. On the other hand it is desirable that the dried ink film exhibits water resistance so that the finished printed substrate surface is unaffected by contact with water.

U.S. Pat. No. 5,284,894 discloses resin-fortified latex polymers for low-foaming printing inks including a dispersed acrylic polymer, a polyelectrolyte resin, and a nonionic emulsifier.

However, improved aqueous ink binder compositions are still desired in order to provide aqueous inks having both press resolubility and, as the dry ink film, water resistance. It has now been found that certain ink binder compositions formed from a certain first polymer and an emulsion polymer exhibit the desired performance in that inks formed therefrom exhibit press resolubility and the dry ink films of those inks exhibit water resistance.

In a first aspect of the present invention there is provided an aqueous ink binder comprising (a) 30–60%, by weight based on the dry weight of said binder composition, of a first polymer comprising, as polymerized units, 15–75%, by weight based on the weight of said first polymer, ethylenically unsaturated carboxylic acid monomer having a pKa from 2.0 to 4.6, said first polymer having a calculated Hansch parameter from 1.3 to 2.1, and (b) 70–40%, by weight based on the dry weight of said binder composition, of a second polymer, said second polymer being an aqueous emulsion polymer.

In a second aspect of the present invention there is provided an aqueous ink comprising an aqueous ink binder and, optionally, a pigment, said ink comprising
(a) a first polymer comprising, as polymerized units, 15–75%, by weight based on the weight of said first polymer, ethylenically unsaturated carboxylic acid monomer having a pKa from 2.0 to 4.6, said first polymer having a calculated Hansch parameter from 1.3 to 2.1, and (b) a second polymer, said second polymer being an aqueous emulsion polymer; wherein the weight ratio of said first plymer to said second polymer on a solids basis is from 0.43:1 to 1.5:1.

In a third aspect of the present invention there is provided method for providing an aqueous ink which has press resolubility and, as a dry film, water resistance comprising
(a) forming an aqueous ink comprising an aqueous ink binder and, optionally, a pigment, said ink comprising
(i) a first polymer comprising, as polymerized units, 15–75%, by weight based on the weight of said first polymer, ethylenically unsaturated carboxylic acid monomer having a pKa from 2.0 to 4.6, said first polymer having a calculated Hansch parameter from 1.3 to 2.1, and (ii) a second polymer, said second polymer being an aqueous emulsion polymer;
wherein the weight ratio of said first polymer to said second polymer on a solids basis is from 0.43:1 to 1.5:1; (b) applying said ink to a substrate with a press; and (c) drying, or allowing to dry, said applied ink.

The aqueous ink binder of the present invention includes 30–60%, preferably 35–60%, by weight based on the dry weight of the binder composition, of a first polymer including, as polymerized units, 15–75%, preferably 20–40%, by weight based on the weight of the first polymer, ethylenically unsaturated carboxylic acid monomer having a pKa from 2.0 to 4.6, preferably from 2.5 to 4.5, more preferably from 3.0 to 4.4, the first polymer having a calculated Hansch parameter from 1.3 to 2.1, preferably. By "aqueous" herein is meant that the medium in which the binder components are dissolved or dispersed is predominantly water. The first polymer includes, as polymerized units, 15–75%, by weight based on the weight of the first polymer, at least one ethylenically unsaturated carboxylic acid monomer having a pKa between 2.0 and 4.6. The pKa of monomers are known in the art and may be found, for example, in Lange's Handbook ($15^{th}$ Edition). The preferred carboxylic acid monomer is acrylic acid.

The first polymer further includes, as copolymerized unit(s), at least one monoethylenically-unsaturated monomer in addition to the carboxylic acid-functional monomer such as, for example, methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate, aminoalkyl (meth)acrylate, N-alkyl aminoalkyl (methacrylate), N,N-dialkyl aminoalkyl (meth)acrylate; urieido (meth)acrylate; (meth)acrylonitrile and (meth)acrylamide; styrene, α-methylstyrene, or other alkyl-substituted styrenes; butadiene; vinyl acetate, vinyl propionate, or other vinyl esters; vinyl monomers such as vinyl chloride, vinylidene chloride, and N-vinyl pyrrolidone. The use of the term "(meth)" followed by another term such as acrylate, acrylonitrile, or acrylamide, as used throughout the disclosure, refers to both acrylate and methacrylate, acrylonitrile and methacrylonitrile, or acrylamide and methacrylamide, respectively. Preferred monoethylenically-unsaturated monomers in addition to the carboxylic acid-functional monomer are styrene, α-methylstyrene, and combinations thereof.

The first polymer composition is selected so as to provide a calculated Hansch parameter from 1.3 to 2.1. In the event that more than one first polymer is present in the ink binder composition, a weight-averaged Hansch parameter is used. The Hansch parameter for a polymer is calculated using a group contribution method. The monomer units forming a polymer are assigned a hydrophobicity contribution and the hydrophobicity of the polymer, the Hansch parameter, is calculated based on the weight average of the monomers in the polymer as disclosed in Hansch and Fujita, J. Amer. Chem. Soc., 86, 1616–1626 (1964); H. Kubinyi, Methods and Principles of Medicinal Chemistry, Volume 1, R. Mannhold et al., Eds., VCH, Weinheim (1993); C. Hansch and A. Leo, Substituent Constants for Correlation Analysis in Chemistry and Biology, Wiley, New York (1979); and C. Hansch, P. Maloney, T. Fujita, and R. Muir, Nature, 194. 178–180 (1962). High pH Hansch parameters are used.

Values of the hydrophobicity contributions for several monomers are:

| Monomer | Hydrophobicity Contribution |
| --- | --- |
| ethyl acrylate | 2.11 |
| butyl acrylate | 3.19 |
| 2-ethyl hexylacrylate | 5.22 |
| styrene | 4.29 |
| α-methylstyrene | 4.7 |
| methyl methacrylate | 1.89 |
| ethyl methacrylate | 2.43 |
| butyl methacrylate | 3.51 |
| isobornyl methacrylate | 2.22 |
| acrylic acid | −2.52 |
| itaconic acid | −3.34 |
| methacrylic acid | −2.2 |
| maleic anhydride | −3.5 |

The first polymer is typically substantially soluble in the aqueous ink composition at pH=8; preferably the first polymer is substantially soluble in the aqueous ink composition at pH=7.0. By "substantially soluble" herein is meant that 10 parts by weight polymer dissolved in 90 parts of the aqueous medium at 25° C. is visually clear.

The first polymer typically has a Mw from 3,000 to 20,000. Mw as reported herein is weight average molecular weight as determined by Gel Permeation chromatography measured vs. polystyrene standards.

The glass transition temperature ("Tg") of the first polymer is typically greater than 70° C., the monomers and amounts of the monomers selected to achieve the desired polymer Tg range are well known in the art. Tgs used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(calc.)=w(M1)/Tg(M1)+w(M2)/Tg(M2),$$

wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in °K.

The glass transition temperatures of homopolymers may be found, for example, in "Polymer Handbook", edited by J. Brandrup and E. H. Immergut, Interscience Publishers.

The free radical addition polymerization techniques used to prepare the first polymer of the ink binder of this invention are well known in the art. Preferred are polymerization in concentrated solution or in bulk, preferably by a semi-continuous or a continuous process using, for example, a plug flow reactor, a CFSTR, or a hot tube reactor. Free-radical generating initiator compounds such as peroxides and hydroperoxides may be used at a level of 0–5% by weight based on total monomer weight. The monomer mixture may be added uniformly as to rate or composition. The reaction temperature is maintained at a temperature between 100° C. and 500° C. for a residence time of 1–30 minutes. Preferred is a reaction temperature between 150° C. and 260° C. for a residence time of 2.5–15 minutes.

The aqueous ink binder of the present invention includes 70–40%, preferably 65–40%, by weight based on the dry weight of said binder composition, of a second polymer which is prepared by aqueous emulsion polymerization. The aqueous emulsion second polymer includes, as (co) polymerized units at least one copolymerized ethylenically unsaturated monomer. Typical ethylenically unsaturated monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth) acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate and other vinyl esters; and vinyl monomers such as vinyl chloride, vinylidene chloride. Preferred are all-acrylic, predominantly acrylic, and styrene/acrylic copolymers.

The second polymer may contain from 0 to 5%, by weight based on the dry weight of the copolymer, copolymerized ethylenically unsaturated acid monomer, based on the weight of the polymer, such as, for example, (meth)acrylic acid, crotonic acid, itaconic acid, fumaric acid, maleic acid, monomethyl itaconate, monomethyl fumarate, monobutyl fumarate, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth) acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate and maleic anhydride. Preferred is 0–1% copolymerized ethylenically unsaturated carboxylic acid monomer; more preferred is 0–1% copolymerized (meth) acrylic acid.

The second polymer may contain from 0% to 5%, by weight based on the dry weight of the copolymer, copolymerized multi-ethylenically unsaturated monomers such as, for example, allyl methacrylate, butadiene, diallyl phthalate, 1,4-butylene glycol dimethacrylate, 1,2-ethylene glycol dimethacrylate, 1,6-hexanediol diacrylate, and divinyl benzene.

The polymerization techniques used to prepare aqueous emulsion-copolymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of such surfactant used is usually 0.1% to 6% by weight, based on the weight of monomer. In a preferred embodiment the emulsion (second) polymer is prepared in the presence of an aqueous solution of the first polymer as the sole surfactant or as a cosurfactant in the polymerization. In a more preferred embodiment the emulsion (second) polymer is prepared in the presence of an aqueous solution of the first polymer at a pH less than 7.5 as the sole surfactant or as a cosurfactant in the polymerization.

Either thermal or redox initiation processes may be used. The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the emulsion polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. Each of the stages of the multi-staged emulsion polymer may contain the same monomers, surfactants, chain transfer agents, etc. as disclosed hereinabove for the emulsion polymer. In the case of a multistaged polymer particle the calculated Tg, the amount of optional monomer or the calculated Hansch parameter for the purpose of this invention is to be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The glass transition temperature ("Tg") of the emulsion polymer is from –80° C. to 120° C. Tgs used herein are those calculated by using the Fox equation as described herinabove. The Hansch parameter of the emulsion polymer is preferably greater than 3.0, more preferably greater than 3.5. The average particle diameter of the emulsion copolymer particles is preferred to be from 30 nanometers to 500 nanometers, as measured by a BI-90 Particle Sizer.

In the second aspect of the present invention there is provided a pigmented or unpigmented aqueous ink suitable for, for example, flexographic, gravure, or offset printing processes. The ink includes an aqueous ink binder and, optionally, one or more pigments including (a) a first polymer including, as polymerized units, 15–75%, by weight based on the weight of the first polymer, ethylenically unsaturated carboxylic acid monomer having a pKa from 2.0 to 4.6, the first polymer having a calculated Hansch parameter from 1.3 to 2.1, and (b) a second polymer, the second polymer being an aqueous emulsion polymer; wherein the weight ratio of the first polymer to the second polymer on a solids basis is from 0.43:1 to 1.5:1, preferably from 0.53:1 to 1.5:1.

The optional pigment is typically dispersed in an aqueous medium by admixing an aqueous medium; a pigment; and a pigment dispersant, as known in the art, and subjecting the admixture to shear for a time sufficient to disperse the pigment. The pigment may be at least one organic or inorganic pigment, a pigment composite, or mixtures thereof. The admixture includes 1–50%, preferably 8–25%, by weight, based on dry pigment weight, of a pigment dispersant. In a preferred embodiment the first polymer of this invention is used as a part, preferably a predominant part, more preferably all, of the pigment dispersant. In an ink containing more than one first polymer the preferred Hansch parameter, on a weight fraction-averaged basis, of all of the first polymer(s) in the ink is from 1.3 to 2.1, more preferably from 1.4 to 2.0, most preferably from 1.5 to 1.9.

The admixture is then subjected to shearing in a grinding or milling device as is well known in the pigment dispersion art. Such grinding or milling devices include roller mills, ball mills, bead mills, attrittor mills and include mills in which the admixture is continuously recirculated. The shearing of the admixture is continued for a time sufficient to disperse the pigment by which is meant herein that the objective of reducing the pigment to its primary particle size to maximize stability and color development is typically balanced against the cost in time and energy required to achieve the ultimate extent of dispersion. The time sufficient to disperse the pigment is typically dependent on the nature of the pigment and pigment dispersant and the grinding or milling device which is used and will be determined by the skilled practitioner. The pigment dispersion is typically provided at 30–50% pigment, by weight, based on the weight of the pigment dispersion. The pigment dispersion may also include additional ingredients such as waxes, defoamers, biocides, other binder resins, thickeners, humectants, and the like or they may be added to the ink later. The ink binder and the pigment dispersion are then admixed with low shear mixing.

In the third aspect of the present invention there is provided a method for providing an aqueous ink which has press resolubility and, as a dry film, water resistance including
(a) forming the aqueous ink of the present invention;
(b) applying the ink to a substrate with a press such as, for example a flexographic, gravure, or offset printing press; and
(c) drying, or allowing to dry, the applied ink.

The following examples are presented to illustrate the invention and the results obtained by the test procedures. Abreviations used throughout:

STY=styrene
AMS=α-methyl styrene
MMA=methyl methacrylate
BA=butyl acrylate
EHA=2-ethylhexyl acrylate
AA=acrylic acid
DI water=deionized water

EXAMPLES 1–8

Preparation of First Polymer

A 11.9 m (39 foot) stainless steel (SS) tube having an inner diameter of 3.2 mm. (0.125 inch) was connected at one end to a high pressure pump (Thermoseparation Model ConstraMetric 3200) and at the other end to a back-pressure control device. Between the two ends, the tube was coiled and situated inside an oven. The oven was equipped with a temperature probe which controlling device regulated the heat imparted to the coiled tube. A heat exchanger was equipped to remove the heat before sample was collected. A second SS tube to deliver dilution solvent was installed. One end of the second tube with an inner diameter of 3.2 mm (0.125 inch) was connected to the first tube before the heat exchanger. The other end was connected to a high pressure pump (Thermoseparation Model ConstraMetric 3200).

A reaction mixture was prepared by mixing solvent, monomer, and initiator. Acetone was pumped through the larger tubing via the high pressure pump at a rate from 1 to 20 ml/min. The pressure was maintained at a level of from 500 to 2000 pounds per square inch ("psi"). The oven was heated to the desired polymerization temperature. After about 15 minutes, the acetone being pumped through the tubing was replaced by the reaction mixture which was continuously pumped through the tubing at a constant rate. At the same time, the dilution solvent was pumped through the smaller second tubing at a rate of 0.5 to 20 ml/min to dilute the polymer before it was cooled down. After allowing a suitable amount of time for the acetone to be cleared from the tubing, product was collected as the effluent from the back-pressure control device. When the reaction mixture was nearly gone, acetone was pumped through the tubing at the same rate and temperature as the reaction mixture. The resin was isolated using a wiped-film-evaporator to remove volatile materials and was dissolved in an aqueous alkali solution. The polymer molecular weights referred to were measured by gel permeation chromatography using a polystyrene standard. Conversion was measured as a function of residual monomer.

Examples 1–8 are first polymers prepared according to the procedure outlined above. The reaction mixture was a 86% by wt solution of the monomers below in Dowanol® DPM and 1.0% by wt, based on total monomer wt, of tert-butyl peroxide. The flow rate was adjusted to provide a residence time of 4 minutes. The compositions and Mws appear in Table 1.1 below.

TABLE 1.1

First polymer compositions and characterization

| Example | STY % | AMS % | MMA % | BA % | AA % | Mw | Hansch Value |
|---|---|---|---|---|---|---|---|
| 1 | 20 | 20 | 20 | 10 | 30 | 11800 | 1.74 |
| 2 | 19 | 20 | 18 | 10 | 33 | 11190 | 1.58 |
| 3 | 0 | 20 | 40 | 10 | 30 | 7500 | 1.26 |
| 4 | 35 | 36 | 0 | 0 | 29 | 7500 | 2.46 |
| 5 | 0 | 40 | 20 | 10 | 30 | 9050 | 1.82 |
| 6 | 0 | 42 | 18 | 11 | 29 | 8570 | 1.93 |
| 7 | 0 | 40 | 20 | 10 | 30 | 7065 | 1.82 |
| 8 | 0 | 40 | 20 | 10 | 30 | 7090 | 1.82 |

EXAMPLES 9–14 AND COMPARATIVE EXAMPLES A–D

Preparation of Second Polymer and Ink Binder

Preparation of Example 9. A four-necked round bottom flask was equipped with a paddle stirrer, thermometer, nitrogen inlet and reflux condenser. To the flask was added 433 g 29.1% solids solution of First Polymer Example 2 and 66 g DI water. The mixture was heated to 81° C. and a solution of 2.4 g ammonium persulfate in 5.6 g DI water was added. A monomer mixture consisting of 46 g BA, 46 g STY, and 118 g EHA was gradually added over 2 hours while the reaction temperature was allowed to increase to 83° C. A solution of 0.38 g ammonium persulfate in 7.5 g DI water was gradually added to the flask over 20 minutes. The reaction mixture was then cooled to 70° C. A solution of 1.47 g tert-butyl hydroperoxide in 7.5 g DI water and a solution of 0.9 g isoascorbic acid and 0.45 g sodium hydroxide in 16 g DI water were both gradually added to the reaction flask over 25 minutes. The reaction mixture was cooled to room temperature and filtered to remove any coagulum formed. The final latex product had a solids content of 40.7% and a particle diameter of 91 nm.

Examples 10–14 and Comparative Examples A–D were prepared according to the procedure of Example 9 using the compositions of Table 9.1 Particle size was measured using a Brookhaven en Instruments Model BI-90 particle size analyzer. Emulsion viscosity was measured using a Brookfield Model LV viscometer and spindle #4 at 30 rpm.

TABLE 9.1

Ink binder compositions and characterization.

| Ink Binder Example | First Polymer From Example | First/Second Polymer (%) | STY (%) | MMA % | BA (%) | EHA (%) | Second Polymer Hansch Value | Wt. % Total Solids | Brookfield Viscosity (cPs, #4/30 rpm) | Particle Size (nm) | pH |
|---|---|---|---|---|---|---|---|---|---|---|---|
| 9 | 1 | 38/62 | 22 | 0 | 22 | 56 | 4.57 | 39.9 | 3110 | 100 | 7.5 |
| 10 | 2 | 38/62 | 22 | 0 | 22 | 56 | 4.57 | 40.7 | 2000 | 91 | 7.4 |
| Comp. A | 3 | 43/57 | 22 | 0 | 22 | 56 | 4.57 | 40.0 | 600 | 91 | 7.1 |
| Comp. B | 3 | 58/42 | 65 | 0 | 0 | 35 | 4.62 | 40.0 | 500 | 90 | 7.0 |
| Comp. C | 3 | 58/42 | 100 | 0 | 0 | 0 | 4.29 | 40.0 | 600 | 90 | 7.0 |
| Comp. D | 4 | 24/75 | 0 | 20 | 50 | 30 | 3.54 | 49.5 | 1500 | 90 | 8.7 |
| 11 | 5 | 58/42 | 65 | 0 | 0 | 35 | 4.62 | 38.2 | — | 100 | 7.2 |
| 12 | 5 | 58/42 | 100 | 0 | 0 | 0 | 4.29 | 37.7 | — | 87 | 7.2 |
| 13 | 6 | 38/62 | 22 | 0 | 22 | 56 | 4.57 | 39.5 | 160 | 101 | 7.0 |
| 14 | 8 | 38/62 | 22 | 0 | 22 | 56 | 4.57 | 40.5 | 240 | 91 | 7.2 |

EXAMPLE 15

Preparation and Evaluation of Aqueous Inks

The ink compositions contained ink binder, pigment dispersion and water to provide a #2 Zahn cup viscosity in the range of 25–30 sec where the #2 Zahn cup viscosities of the compared inks were adjusted to within 1 second of each other, and the pigment contents were maintained equivalent.

A starting composition was prepared by mixing:

| Component | Parts by weight |
|---|---|
| Flexiverse ® RFD-3217 pigment dispersion | 28 |
| Water | 22 |
| Ink Binder(adjusted to pH = 8.5–9.0 with NH4OH) | 50 |

The inks were adjusted to equivalent #2 Zahn cup viscosity and pigment content by adding water and pigment dispersion, as needed, such that the final viscosity fell within the range of 25–30 seconds. The inks were coated on corona-treated, low density polyethylene (LDPE) film using a Pamarco handproofer equipped with a 118 anilox cells per cm (300 anilox cells per inch) cylinder to create a split proof (side-by-side) of the test and comparative inks, which was dried at 120° F. for 15 seconds. The water resistance test was started one minute after the sample was removed from the oven. Then 4 drops of water were placed on each of the films for the specified contact time, followed by visually rating film clarity and rubbing over the film surface once with a wet paper tissue to test resistance of the film to dissolution or softening during exposure. The tested areas were rated using the following scale:

1=total water whitening, total film removal
2=moderate water whitening, moderate film removal
3=slight water whitening, slight film removal, wrinkling
4=slight water whitening, no film removal
5=no water whitening, no film removal Press stability and rewet, or resolubility, performance of each ink formulation was determined on a Geiger Gravure Proofing Press equipped with a small gravure cylinder with 79 anilox cells per cm (200 anilox cells per in). Printing was accomplished by direct transfer of the ink from the cylinder to the substrate. An initial print was taken after start-up, and the press was shut down for 5 minutes, allowing the ink to dry in the cylinder cells, after which the press was re-started and prints were made after 1, 5, 10 and 15 minutes of running. The print quality was rated using a 1–5 scale where 1=poor print quality and 5=excellent print quality and equivalence to the initial start-up print. It is desirable to obtain excellent print quality in the shortest amount of time after re-start of the printing operation after drying in of the ink on press.

TABLE 15.1

Evaluation of water resistance of dry ink and press resolubility ("Resol.") of ink

| Ink Binder Ex. | Wt. % First Polymer in Ink Binder | First Polymer Hansch Value | Water Resistance After 1 min. | Water Resistance After 10 min. | Resol. After 1 min. | Resol. After 10 min. |
|---|---|---|---|---|---|---|
| 9 | 38 | 1.74 | 5 | 5 | 2 | 4 |
| 10 | 38 | 1.58 | 4 | 4 | 2 | 2 |
| Comp. A | 43 | 1.26 | 1 | 1 | 3 | 4 |
| Comp. B | 58 | 1.26 | 2 | 1 | 5 | 5 |
| Comp. C | 58 | 1.26 | 2 | 1 | 5 | 5 |
| Comp. D | 24 | 2.46 | 5 | 5 | 1 | 1 |
| 11 | 58 | 1.82 | 4 | 3 | — | — |
| 12 | 58 | 1.82 | 3 | 2 | — | — |
| 13 | 38 | 1.93 | 5 | 5 | — | — |

Inks of the present invention containing the ink binders of Examples 9–13 of the present invention exhibit superior performance in water resistance and press resolubility when compared to inks containing ink binders of Comparative Examples A–D.

EXAMPLE 16

Preparation of Pigment Dispersion and Aqueous Inks and Evaluation of Inks

A pigment dispersion of Sunfast® Blue 15:3 (Sun Chemical 249–1282) phthalo blue pigment was prepared by mixing together the following ingredients.

| | |
|---|---|
| Example 7 first polymer solution (31.8%) | 146.75 g |
| Water | 269.75 g |
| PI-35 defoamer (100%, Ultra Additives) | 3.5 g |
| Pigment (100%) | 280.0 g | to give 40.0 wt. % pigment loading and a pigment/resin ratio of 6/1. The dispersion pH was adjusted to 7.0 with $NH_4OH$.

The mixture was pre-dispersed at moderate speed for 15 minutes using a laboratory stirrer equipped with a propeller blade and then milled on an Eiger Mini Motormill 250 (Eiger Machinery) for 20 minutes at 4000 rpm. Particle size was measured with a Gardco® fineness of grind gauge and was <1 micron. Viscosity of the pigment dispersion was measured on a Brookfield DV-I+viscometer using spindle #2 at 60 rpm and was 71 cPs.

Substantially neutral pH inks were prepared by mixing together the neutral pH phthalo blue pigment dispersion prepared above with the ink binders of Examples 14 and Comparative A in the following amounts.

| | |
|---|---|
| Pigment dispersion above (47.2%) | 17.06 g |
| Water | 2.06 g |
| Ink Binder (40.5%) | 40.55 g |

The final inks were adjusted to a #2 Zahn cup viscosity of 26 seconds and equivalent pigment content by adding water and pigment dispersion, as needed. The final pH of the inks was 7.1. The inks were coated on corona-treated, LDPE film using a Pamarco handproofer equipped with a 300 anilox cells per inch cylinder to create a split proof (side-by-side) of the inks, which was dried at 120° F. and 15 seconds. Water resistance of the dried film was tested using the water spot method described above.

TABLE 16.1

Evaluation of inks

| Ink Binder of Example | Hansch Value of First Polymer in Ink Binder | Hansch Value of First Polymer in Pigment Dispersion | Wt. Avg Hansch value of First Polymer in Ink | Water Resistance After 1 min. | Water Resistance After 10 min. |
|---|---|---|---|---|---|
| 14 | 1.82 | 1.82 | 1.82 | 5 | 5 |
| Comp. A | 1.26 | 1.82 | 1.31 | 4 | 4 |

Inks of the present invention in which the weight-averaged Hansch Value is a result of first polymer from the ink binder and from the pigment dispersant exhibited excellent water resistance.

What is claimed is:

1. An aqueous ink binder comprising
   (a) 30–60%, by weight based on the dry weight of said binder composition, of a first polymer comprising, as polymerized units, 15–75%, by weight based on the weight of said first polymer, ethylenically unsaturated carboxylic acid monomer having a pKa from 2.0 to 4.6, said first polymer having a calculated Hansch parameter from 1.3 to 2.1, and
   (b) 70–40%, by weight based on the dry weight of said binder composition, of a second polymer, said second polymer being an aqueous emulsion polymer.

2. The aqueous ink binder of claim 1 wherein said binder is formed by the process comprising forming said second polymer in the presence of said first polymer.

3. An aqueous ink comprising an aqueous ink binder and, optionally, a pigment, said ink comprising
   (a) a first polymer comprising, as polymerized units, 15–75%, by weight based on the weight of said first polymer, ethylenically unsaturated carboxylic acid monomer having a pKa from 2.0 to 4.6, said first polymer having a calculated Hansch parameter from 1.3 to 2.1, and
   (b) a second polymer, said second polymer being an aqueous emulsion polymer;
   wherein the weight ratio of said first polymer to said second polymer on a solids basis is from 0.43:1 to 1.5:1.

4. The aqueous ink of claim 3 comprising said pigment wherein said pigment has been dispersed in the presence of at least some of said first polymer.

5. The aqueous ink of claim 3 or claim 4 wherein said ink has a pH less than 7.5.

6. A method for providing an aqueous ink which has press resolubility and, as a dry film, water resistance comprising
   (a) forming an aqueous ink comprising an aqueous ink binder and, optionally, a pigment, said ink comprising
      (i) a first polymer comprising, as polymerized units, 15–75%, by weight based on the weight of said first polymer, ethylenically unsaturated carboxylic acid monomer having a pKa from 2.0 to 4.6, said first polymer having a calculated Hansch parameter from 1.3 to 2.1, and
      (ii) a second polymer, said second polymer being an aqueous emulsion polymer;
      wherein the weight ratio of said first polymer to said second polymer on a solids basis is from 0.43:1 to 1.5:1;
   (b) applying said ink to a substrate with a press; and
   (a) drying, or allowing to dry, said applied ink.

7. The method of claim 6 wherein said ink comprises said pigment wherein said pigment has been dispersed in the presence of at least some of said first polymer.

8. The method of claim 6 or claim 7 wherein said ink has a pH less than 7.5.

* * * * *